Patented Mar. 10, 1942

2,275,470

UNITED STATES PATENT OFFICE 2,275,470

METHOD OF MAKING MIXED ARYL HYDROXYALKYL AMINES

Robert G. Ruark, Pittsburgh, Pa., assignor to Carbide and Carbon Chemicals Corporation, a corporation of New York No Drawing. Application January 31, 1939, Serial No. 253,779

6 Claims. (Cl. 260—573)

This invention is directed to an improvement in the processes for making hydroxyalkyl derivatives of aromatic amines.

A basic process for making these derivatives involves heating a primary aromatic amine with ethylene oxide in a closed vessel. When the reaction is carried out using aniline, for example, it is possible to replace either one or two of the available hydrogens in the amino group with the hydroxy-ethyl radical and to obtain correspondingly phenyl monoethaonolamine or phenyl diethanolamine. In previous processes, it has been very difficult to obtain the completely hydroxyalkylated compound. If exactly two mols of ethylene oxide are reacted with exactly one mol of aniline, it has proved difficult to obtain satisfactory yields of the phenyl diethanolamine, since considerable amounts of phenyl monoethanolamine are also formed. If an excess of ethylene oxide is employed, in order to insure complete hydroxyalkylation of the amine, there is a tendency for the reactive ethylene oxide to react further with the hydroxyl group of the hydroxyalkyl substituents to form glycol ether derivatives.

The present invention has for its object the production of pure, hydroxyalkylated aromatic tertiary amines in satisfactory yields by the reaction of a primary or secondary aromatic amine or a mixed aliphatic aromatic secondary amine with an alkylene oxide.

To achieve this object the reaction must be carried out under certain specified conditions. It has been found necessary, for this purpose, to carry out the reaction under heating at temperatures of about 80° C. to about 140° C. It has also been found that, to achieve the object of this invention, the alkylene oxide must be reacted with the amine in substantially stoichiometrical amounts, that is, about two mols of alkylene oxide per mol of primary aromatic amine or about one mol of alkylene oxide per mol of secondary amine. Furthermore, it is necessary to add the alkylene oxide continuously during the reaction. It has been observed that such continuous addition of the alkylene oxide during the reaction, in comparison with a batch process for carrying out the reaction, promotes the formation of the completely hydroxyalkylated tertiary amines and avoids the formation of objectionable amounts of the incompletely hydroxyalkylated secondary amines.

A convenient method for controlling the rate of addition of the alkylene oxide to the reactants is to provide a pressure gauge on the reaction vessel. The alkylene oxide should be added at about its reaction rate with the amine and this can be controlled by observing the pressure in the reaction vessel. If the rate of addition of the alkylene oxide is greater than the reaction rate, the pressure within the vessel will rise. It is preferable not to permit the pressure to exceed about 36 pounds per square inch during the reaction in order to insure that objectionable amounts of the incompletely hydroxyalkylated secondary amines may not be formed.

Operation of the process in a continuous manner presents another advantage in that the reaction may be carried out at much lower pressures than would be obtainable if a batch process were practiced. In the latter case, at the reaction temperatures employed, the gauge pressures might range from about 110 pounds per square inch to about 390 pounds per square inch, corresponding to the estimated vapor pressures of ethylene oxide at the lower and upper reaction temperatures. The process of this invention therefore provides a safer and more convenient method of carrying out this reaction.

Reactions to which this process of forming completely hydroxyalkylated aromatic tertiary amines may be applied include reactions between alkylene oxides, such as ethylene, propylene, or butylene oxides, and primary or secondary aromatic amines, or mixed aliphatic aromatic secondary amines. As examples of these amines may be mentioned aniline and its derivatives, diphenyl amine, phenyl benzyl amine, ethyl aniline (phenyl ethyl amine), phenyl isopropyl amine, and the like.

The practice of the invention is illustrated by the following examples:

Example 1

A jacketed, agitated reaction vessel was charged with 93 parts by weight of aniline and heated to 90° to 95° C. Eighty-eight (88) parts of ethylene oxide, corresponding to a molar ratio of two parts of ethylene oxide to one of aniline, were added continuously. The rate of addition was maintained at approximately the rate of reaction of the ethylene oxide with the aniline. Under these conditions the gauge pressure within the reaction vessel did not exceed 10 to 15 pounds per square inch.

When the reaction was completed, the reaction was cooled to 60° to 70° C. and then discharged into containers. The containers were slightly agitated during cooling to assure slow crystallization of the product.

By operating in this manner, an almost quantitative yield of phenyl diethanolamine of exceptional purity for a commercial product was obtained. The amount of aniline present in the product was less than 0.1% and the amount of phenyl monoethanolamine was less than 1.0%. No detectable amounts of glycol-ether derivatives existed in the product, and the product was suitable for commercial use without purification.

Example 2

By operating in substantially the same manner as in Example 1, ethyl aniline was reacted with ethylene oxide to produce phenyl ethyl ethanolamine. Points of exception were that, in this case, equal molar ratios of the reactants were employed and slightly higher reaction temperatures used.

Modifications of the invention other than as disclosed will be readily apparent to chemists and are included within the scope of the invention as defined in the appended claims.

I claim:

1. In the reaction of an alkylene oxide with an aryl amine to produce hydroxyalkylated aryl tertiary amines, the step of reacting substantially stoichiometrical amounts of an alkylene oxide with an aryl amine of the group consisting of aryl primary amines, aryl secondary amines, and mixed aryl aliphatic secondary amines by the addition of alkylene oxide to a body consisting of the heated amine at a rate so correlated to the temperature and pressure at which the reaction is conducted that alkylene oxide is supplied at substantially the same rate that alkylene oxide is consumed.

2. In the reaction of an alkylene oxide with an aryl amine to produce hydroxyalkylated aryl tertiary amines, the step of reacting substantially stoichiometrical amounts of an alkylene oxide with an aryl amine of the group consisting of aryl primary amines, aryl secondary amines, and mixed aryl aliphatic secondary amines in which the alkylene oxide is added to a heated body consisting of the amine maintained at a temperature of from about 80° C. to about 140° C. at such a rate that the gauge pressure within the reaction vessel does not exceed about 36 pounds per square inch.

3. In the reaction of ethylene oxide with an aryl amine to produce hydroxyethylated aryl tertiary amines, the step of reacting substantially stoichiometrical amounts of ethylene oxide with an aryl amine of the group consisting of aryl primary amines, aryl secondary amines, and mixed aryl aliphatic secondary amines by the addition of ethylene oxide to a body consisting of the heated amine at a rate so correlated to the temperature and pressure at which the reaction is conducted that ethylene oxide is supplied at substantially the same rate that ethylene oxide is consumed.

4. In the reaction of ethylene oxide with an aryl amine to produce hydroxyethylated aryl tertiary amines, the step of reacting substantially stoichiometrical amounts of ethylene oxide with an aryl amine of the group consisting of aryl primary amines, aryl secondary amines, and mixed aryl aliphatic secondary amines in which ethylene oxide is added to a heated body consisting of the amine maintained at a temperature of from about 80° C. to about 140° C. at such a rate that the gauge pressure within the reaction vessel does not exceed 36 pounds per square inch.

5. In the reaction of ethylene oxide with aniline to produce phenyl diethanolamine, the step of reacting substantially stoichiometrical amounts of ethylene oxide with aniline by the addition of ethylene oxide to a body consisting of heated aniline at a rate so correlated to the temperature and pressure at which the reaction is conducted that ethylene oxide is supplied at substantially the same rate that ethylene oxide is consumed.

6. In the reaction of ethylene oxide with aniline to produce phenyl diethanolamine, the step of reacting approximately two mols of ethylene oxide with one mol of aniline in which the ethylene oxide is added to a heated body consisting of the aniline maintained at a temperature of from about 80° C. to about 140° C. at such a rate that the gauge pressure within the reaction vessel does not exceed about 36 pounds per square inch.

ROBERT G. RUARK.